(12) United States Patent
Chanchalani et al.

(10) Patent No.: US 10,977,572 B2
(45) Date of Patent: Apr. 13, 2021

(54) INTELLIGENT SEARCHING OF ELECTRONICALLY STORED INFORMATION

(71) Applicant: Exterro, Inc., Beaverton, OR (US)

(72) Inventors: Tarun Chanchalani, Coimbatore (IN); Bala Manikandan Gopalakrishnan, Coimbatore (IN); Ramya Ramasamy, Coimbatore (IN); Pallav Tandon, Beaverton, OR (US); Aniesh Udayakumar, Coimbatore (IN); Scott Giordano, Beaverton, OR (US); Dan Burke, Beaverton, OR (US); Manish Bafna, Coimbatore (IN); Shashidhar Angadi, Beaverton, OR (US); Prabhu Palanisamy, Coimbatore (IN); Bobby Balachandran, Beaverton, OR (US); Karthik Palani, Beaverton, OR (US); Ajith Samuel, Beaverton, OR (US)

(73) Assignee: Exterro, Inc., Beaverton, OR (US)

( * ) Notice: Subject to any disclaimer, the term of this patent is extended or adjusted under 35 U.S.C. 154(b) by 0 days.

(21) Appl. No.: 14/930,448

(22) Filed: Nov. 2, 2015

(65) Prior Publication Data

US 2016/0224904 A1     Aug. 4, 2016

Related U.S. Application Data

(63) Continuation of application No. 13/842,910, filed on Mar. 15, 2013, now abandoned.

(51) Int. Cl.
*G06N 7/00*     (2006.01)
*G06F 16/22*    (2019.01)
*G06N 20/00*    (2019.01)

(52) U.S. Cl.
CPC ......... *G06N 20/00* (2019.01); *G06F 16/2228* (2019.01); *G06N 7/005* (2013.01)

(58) Field of Classification Search
USPC ........................................... 706/12
See application file for complete search history.

(56) References Cited

U.S. PATENT DOCUMENTS

| | | | | |
|---|---|---|---|---|
| 6,151,218 A  * | 11/2000 | Pirdy ................... | G06F 1/1632 |
| | | | | 361/679.41 |
| 6,310,911 B1 * | 10/2001 | Burke ....................... | H04J 3/14 |
| | | | | 370/241 |
| 7,857,690 B2 * | 12/2010 | Yanke ..................... | A01F 12/28 |
| | | | | 460/109 |
| 8,011,003 B2 * | 8/2011 | Rowney ................ | H04L 51/063 |
| | | | | 709/225 |
| 8,157,629 B2 * | 4/2012 | Yanke ..................... | A01F 12/28 |
| | | | | 460/109 |

(Continued)

OTHER PUBLICATIONS

IEEE Application of dynamic logistic regression with unscented Kalman filter in predictive coding, Yihua Shi Astle; Xuning Tang; Craig Freeman 2017 IEEE International Conference on Big Data (Big Data) Dec. 11-14, 2017 pp. 1381-1389 IEEE.*

(Continued)

*Primary Examiner* — Michael B Holmes (57) ABSTRACT

Technologies and implementations for training a predictive intelligence associated with electronic discovery (e-discovery) are generally disclosed.

18 Claims, 5 Drawing Sheets

(56) References Cited

U.S. PATENT DOCUMENTS

| | | | | |
|---|---|---|---|---|
| 8,484,069 B2* | 7/2013 | Kisin | ............... | G06Q 10/00 |
| | | | | 705/7.35 |
| 8,489,439 B2* | 7/2013 | Kisin | ............... | G06Q 10/00 |
| | | | | 705/7.11 |
| 9,269,053 B2* | 2/2016 | Naslund | ............... | G06N 20/00 |
| 9,866,315 B2* | 1/2018 | Keyworth | ............ | H04J 14/0213 |
| 10,254,570 B2* | 4/2019 | Burke | ............... | G02F 1/3775 |
| 10,823,987 B2* | 11/2020 | Burke | ............... | G02F 1/0123 |
| 2014/0330755 A1* | 11/2014 | Chanchalani | ........ | G06N 7/005 |
| | | | | 706/12 |
| 2016/0224904 A1* | 8/2016 | Chanchalani | ........ | G06N 7/005 |
| 2016/0316281 A1* | 10/2016 | Keyworth | ............ | H04J 14/0212 |
| 2017/0039500 A1* | 2/2017 | Leidner | ............... | G06Q 10/06 |
| 2018/0165295 A1* | 6/2018 | Angadi | ............... | G06F 16/1748 |

OTHER PUBLICATIONS

Artificial Intelligence and Law Dec. 2010, vol. 18, Issue 4, pp. 459-479 A new tangible user interface for machine learning document review.*

* cited by examiner

400 A computer program product

402 A signal bearing medium

404 Machine-readable instructions that, when executed by one or more processors, operatively enable a predictive intelligence training module to:

receive an electronic information index;

receive criteria to train a predictive intelligence;

search a portion of the received electronic information index applicable to the trained predictive intelligence;

verify the trained predictive intelligence using the searched portion;

determine if the verification of the trained predictive intelligence meets a particular accuracy threshold; and apply the trained predictive intelligence to the received electronic information index upon determining that the verification meets the particular accuracy threshold.

| 406 a computer-readable medium | 408 a recordable medium | 410 a communications medium |

INTELLIGENT SEARCHING OF ELECTRONICALLY STORED INFORMATION

RELATED APPLICATION

This application is a continuation application of U.S. patent application Ser. No. 13/842,910, filed on Mar. 15, 2013, titled INTELLIGENT SEARCHING OF ELECTRONICALLY STORED INFORMATION. The disclosure of U.S. patent application Ser. No. 13/842,910 is incorporated herein by reference in its entirety.

BACKGROUND

Unless otherwise indicated herein, the approaches described in this section are not prior art to the claims in this application and are not admitted to be prior art by inclusion in this section.

In general, when litigation has been determined to be reasonably likely, a party may have a duty to preserve material that may be determined to be relevant to the litigation. The material may be in an electronic form (i.e., electronically stored information). The preserved material may need to be reviewed for a variety of potential legal issues before being exchanged (e.g., during electronic discovery).

SUMMARY

Detailed herein are various methods for training a predictive intelligence associated with electronic discovery (e-discovery). Example methods may include receiving an electronic information index, receiving criteria to train the predictive intelligence, searching a portion of the received electronic information index applicable to the trained predictive intelligence, verifying the trained predictive intelligence using the searched portion, determining if the verification of the trained predictive intelligence meets a particular accuracy threshold, and applying the trained predictive intelligence to the received electronic information index upon determining that the verification meets the particular accuracy threshold.

The present disclosure also describes various example machine readable non-transitory storage media having stored therein instructions that, when executed by one or more processors, operatively enable a predictive intelligence training module to receive an electronic information index, receive criteria to train a predictive intelligence, search a portion of the received electronic information index applicable to the trained predictive intelligence, verify the trained predictive intelligence using the searched portion, determine if the verification of the trained predictive intelligence meets a particular accuracy threshold, and apply the trained predictive intelligence to the received electronic information index upon determining that the verification meets the particular accuracy threshold.

The present disclosure also describes various example systems for training a predictive intelligence associated with electronic discovery (e-discovery). Example systems may include a processor and a predictive intelligence training module communicatively coupled to the processor. The predictive intelligence training module including a machine readable non-transitory medium having stored therein instructions that, when executed by the processor, operatively enable the predictive intelligence training module to receive an electronic information index, receive criteria to train a predictive intelligence, search a portion of the received electronic information index applicable to the trained predictive intelligence, verify the trained predictive intelligence using the searched portion, determine if the verification of the trained predictive intelligence meets a particular accuracy threshold, and apply the trained predictive intelligence to the received electronic information index upon determining that the verification meets the particular accuracy threshold.

The foregoing summary is illustrative only and not intended to be in any way limiting. In addition to the illustrative aspects, embodiments, and features described above, further aspects, embodiments, and features will become apparent by reference to the drawings and the following detailed description, which are also illustrative only and not intended to be limiting.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings.

DETAILED DESCRIPTION

The following description sets forth various examples along with specific details to provide a thorough understanding of the present disclosure. The various embodiments may be practiced without some or more of the specific details disclosed herein. Further, in some circumstances, well-known methods, procedures, systems, components and/or circuits have not been described in detail, for the sake of brevity and clarity.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to training a predictive intelligence associated with electronic discovery (e-discovery).

In general, as part of electronic discovery (here on out e-discovery), a reviewer, usually an attorney, may review numerous documents in an electronic document set (a corpus) to identify, classify and/or categorize the documents based at least in part on their content and/or the context. Manually reviewing, identifying, classifying, and/or categorizing may be very time consuming and difficult due to the amount of electronic information that may be involved. Using some form of automated predictive intelligence for identifying, classifying, and/or categorizing may provide some assistance to the reviewer.

Figure 1:
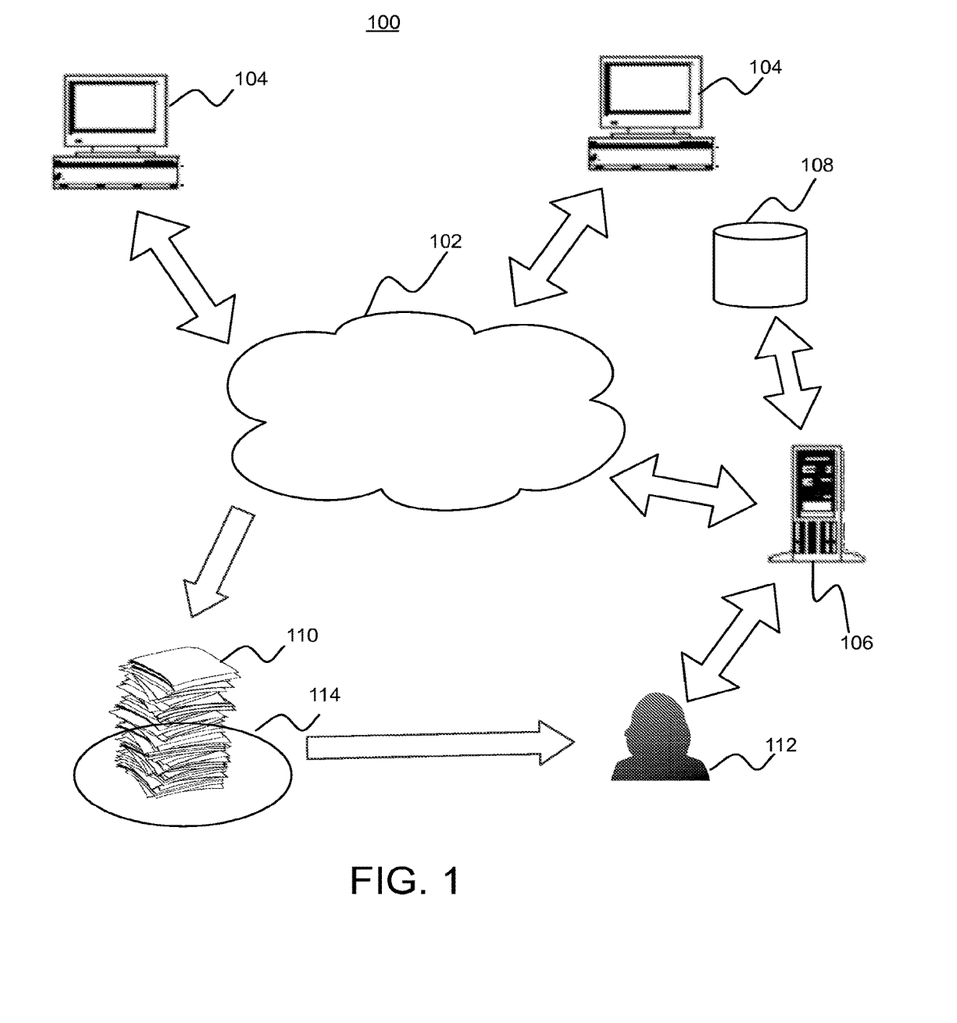
FIG. 1 illustrates a system in accordance with various embodiments.

FIG. 1 illustrates a system in accordance with various embodiments. The system 100 may include a network 102 and one or more client devices 104 communicatively coupled to the network 102. Additionally, a server device 106 may be communicatively coupled to the network 102. The server device 106 may also be communicatively coupled to a database 108. Together, the one or more client devices 104, the server device 106, the database 108, and the illustrates a block diagram of an example e-discovery system 100, arranged in accordance with at least some embodiments of the present disclosure network 102 may make up an electronic information infrastructure of an organization, where electronically stored information (ESI) may reside in various data sources.

In general, predictive intelligence may be a form of machine intelligence. In some examples, predictive intelligence may operate on a data set to determine a representation of the data that may facilitate further data processing operations. In one non-limiting example, a set of documents may be indexed such that the index may include representations of one or more of the documents in terms of symbolic relationships. In some examples, the index may be searched based on the symbolic relationships to identify symbolically relevant results. In some examples, predictive intelligence may include feedback provided from a human operator to guide and/or improve data processing operations. In some examples, predictive intelligence may include machine learning to guide and/or improve data processing operations. In some examples, the predictive intelligence may be implemented on a computing device and/or implemented in a module executed by the computing device.

In FIG. 1, as part of an e-discovery process, from the ESI, an electronic information index 110 may be gathered and received by the server device 106. The electronic information index 110 may be in the form of an indexed ESI. In one example, a reviewer 112 may use randomly sampled portion 114 (e.g., machine random sampling) of the electronic information index 110 in order to identify files (e.g., electronic documents or records) that may have a probability of being affirmatively responsive to some criterion or question associated with the e-discovery process, and the reviewer 112 may label these files as "responsive". Files that do not have a probability of being affirmatively responsive to some criterion or questions may be labeled as "non-responsive". Optionally, the reviewer 112 may not label a file, but instead mark the file so as not to be used for training a predictive intelligence.

In another example, the reviewer 112 may review the electronic information index 110 and may identify files (i.e., a portion 114) that may have a probability of being affirmatively responsive to some criterion or question associated with the e-discovery process, and the reviewer 112 may label these files as "responsive" (i.e., judgmental sampling). As previously described, files that do not have a probability of being affirmatively responsive to some criterion or questions may be labeled as "non-responsive". Optionally, the reviewer 112 may not label a file, but instead mark the file so as not to be used for training a predictive intelligence.

Once the reviewer 112 has accumulated a threshold amount (i.e., the portion 114) of the electronic information index 110, the reviewer 112 may provide the labeled files to a computer (e.g., the server device 106). Providing the references to the labeled files to the server device 106 may facilitate providing criteria to train a predictive intelligence associated with e-discovery, in accordance with various embodiments. That is, training the predictive intelligence may include configuring the server device 106 to recognize which files may be considered to be responsive and which files may be considered to be non-responsive, and accordingly, training the predictive intelligence. The criteria may be stored as rules in the database 108.

Once the predictive intelligence has been trained, a search may be performed on the portion 114 applicable to the trained predictive intelligence. In one example, the search on the portion 114 may be used to verify the trained predictive intelligence, where the trained predictive intelligence may review each file, determine a percent probability of the responsiveness of each file, and display and/or store the results. The reviewer 112 may review the results and determine if the predictive intelligence meets a particular accuracy threshold for the search. The reviewer 112 may determine the particular accuracy threshold based at least in part on the reviewer's judgment. For example, determining if the results of the trained predictive intelligence is consistent with the determination of the reviewer 112 on the portion 114 (i.e., follows the criteria). If it is determined that the trained predictive intelligence meets the particular accuracy threshold, the predictive intelligence may be applied to the entire corpus of the ESI (received electronic information 110). The predictive intelligence may review each file, determine a percent probability of the responsiveness of each file, and display and/or store the results.

If it is determined that the trained predictive intelligence does not meet the particular accuracy threshold, the reviewer 112 may perform additional random and/or judgmental sampling to further train the predictive intelligence. For example, the reviewer 112 may provide further criteria based at least in part on additional random and/or judgmental samplings to the predictive intelligence. The further trained predictive intelligence may be verified by applying the further trained predictive intelligence to the previous portion 114 and any additional portions (not shown). Similar to the previously described, if it is determined that the further trained predictive intelligence meets the particular accuracy threshold, the further predictive intelligence may be applied to the entire corpus of the ESI (received electronic information 110). Accordingly, the predictive intelligence may continue to be trained in an iterative manner.

Once the predictive intelligence is applied to the entire corpus of the ESI, a labeled corpus may result. A probability of being affirmatively responsive to some criterion or question associated with the e-discovery process may be determined and associated with each searched file of the corpus. Additionally, the searched files may be sorted by relevance. The sorted files may facilitate determination of files having relevancy that may exceed a particular threshold. Files that exceed a particular threshold may be produced directly to another party or used in some other manner. That is, the predictive intelligence may help predict these types of files.

Alternatively, the sorted files may facilitate prediction of files, which most likely may be responsive.

Figure 2:
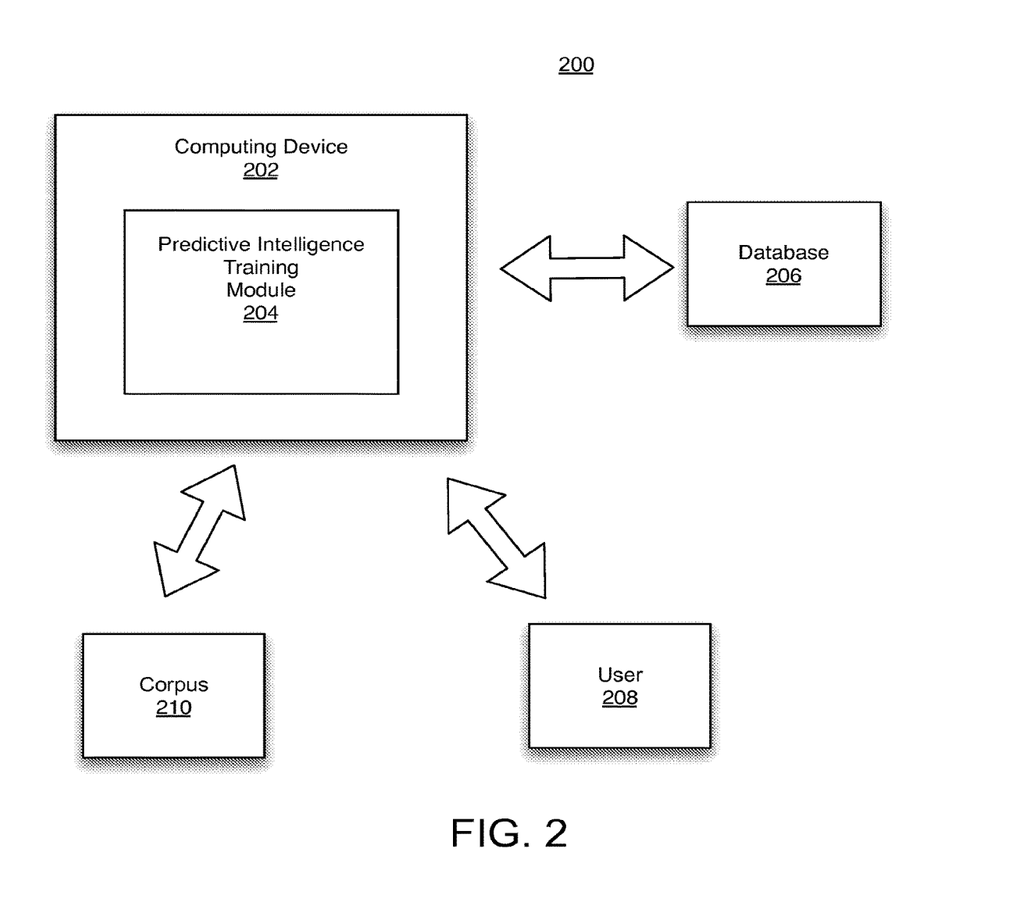
FIG. 2 illustrates a block diagram of an example predictive intelligence module.

FIG. 2 illustrates a block diagram of a predictive intelligence training system 200, arranged in accordance with at least some embodiments of the present disclosure. As can be seen in this figure, a computing device 202 may include a predictive intelligence training module 204. Additionally, the computing device 202 may be communicatively coupled with a database 206, a user 208, and a corpus 210. As previously described, the computing device 202 may receive an electronic information index from the corpus 210. Namely, the predictive intelligence training module 204 may be operatively enabled to receive the electronic information index. The corpus 210 may be documents/records to be indexed related to electronically stored information included in an information infrastructure of an organization. The ESI may be in situ (i.e., may reside on one or more devices on the network). The computing device may be the server device 106 and/or one or more client devices 104. Alternatively, the computing device 202 may be ubiquitous (e.g., cloud) based computing device, and accordingly, the claimed subject matter is not limited in these respects.

The predictive intelligence training module 204 may receive the electronic information index. The user 208 may provide the portion 114 of the received electronic information index 110 to the computing device 202 resulting in criteria being received by the predictive intelligence training module 204. The received criteria may be stored in the database 204. The received criteria may be used by the predictive intelligence training module 204 to train the predictive intelligence.

The predictive intelligence training module 204 may perform a search on the portion 114 to verify the trained predictive intelligence using the received search portion. The predictive intelligence training module 204 may determine if the verification of the trained predictive intelligence meets a particular accuracy threshold. If the verification of the trained predictive intelligence meets a particular accuracy threshold, the predictive intelligence training module 204 may apply the trained predictive intelligence to the corpus 210.

In one example, the predictive intelligence training module 204 may generate relevant documents/records and lock them prevent access and/or changes. Identification of relevant documents may include providing a listing of documents and/or a listing of relevant documents. The listing of documents may further include information associated with each listed document, such as the locations of the documents, the probability of being affirmatively responsive to some criterion or question associated with the e-discovery process of the documents, the locked status of the documents, or the like. In some examples, the listing of these documents may be sorted, for example sorted by the probability of being affirmatively responsive to some criterion or question associated with the e-discovery process so that the documents indicated as most likely to be relevant are listed first. The listing of relevant documents may be saved, printed, and/or displayed, or the like.

In another example, the predictive intelligence training module 204 may receive further criteria for further train the trained predictive intelligence, and apply the further trained predictive intelligence to the corpus 210. As described above with respect to FIG. 1, the further training may be an iterative process.

In one example, the predictive intelligence training module 204 may receive electronic information index may be received via a bot that may go out to the network 102 and find ESI for indexing. The ESI may be included as part of an electronic information infrastructure of an organization.

In another example, the predictive intelligence training module 204 may receive criteria related to information being responsive to an e-discovery request.

The corpus 210 may be any type of electronic data such as, but not limited to a collection of documents, records, images, sounds, files, etc., and accordingly, the claimed subject matter is not limited in these respects.

The predictive intelligence training module 204 may be implemented in any type of manner in a computing environment such as, but not limited to, implemented in hardware, software, or any combination thereof.

Even though a user/reviewer may be referred to, it is contemplated within the present disclosure that a machine may also provide criteria. For example, the predictive intelligence training module 204 may receive training from another predictive intelligence training module (not shown) that may have had enough iterations to be relatively accurate. That is, a more accurate predictive intelligence training module may train a less accurate predictive training module.

Figure 5:
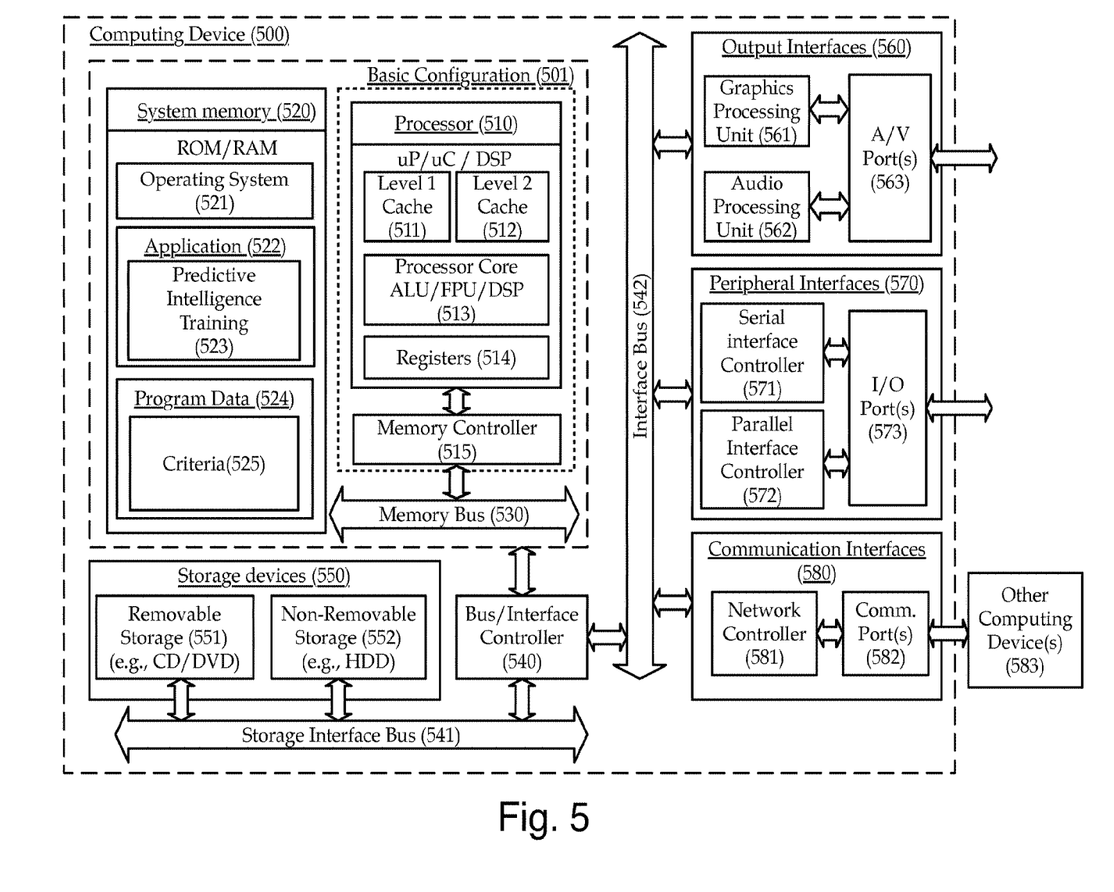
FIG. 5 illustrates a block diagram of an example computing device, all arranged in accordance with at least some embodiments of the present disclosure.

Additionally, predictive intelligence may be of a wide variety of form such as an application as described with respect to FIG. 5 or any other form of hardware and/or software.

Figure 3:
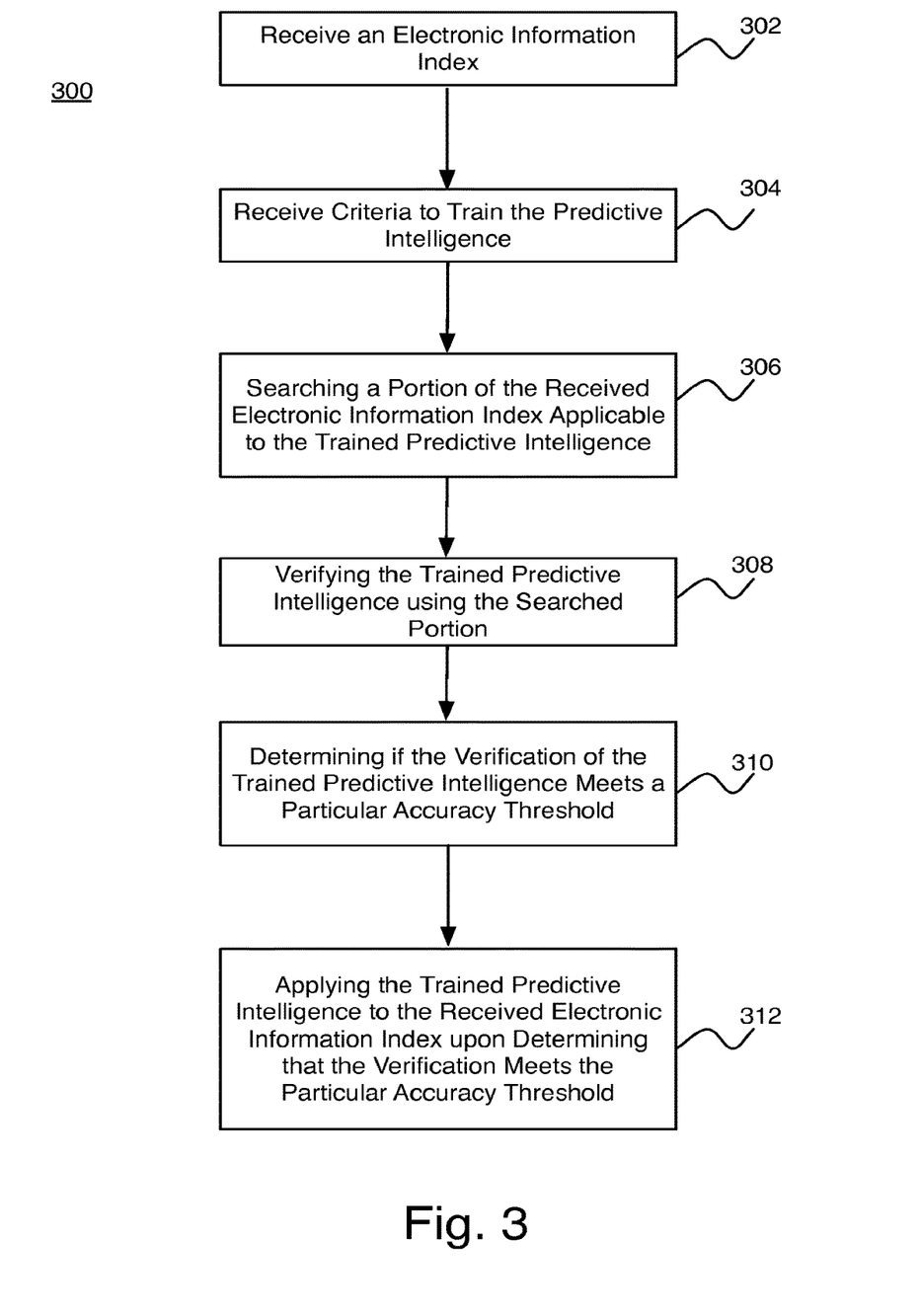
FIG. 3 illustrates a flow chart of an example method for training a predictive intelligence.

FIG. 3 illustrates a flow chart of an example method 300 for training predictive intelligence associated with e-discovery, arranged in accordance with at least some embodiments of the present disclosure. This figure employs block diagrams to illustrate the example methods detailed therein. These block diagrams may set out various functional blocks or actions that may be described as processing steps, functional operations, events and/or acts, etc., and may be performed by hardware, software, firmware, and/or combination thereof, and need not necessarily be performed in the exact order shown. Numerous alternatives or additions to the functional blocks detailed (and/or combinations thereof) may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described and other rearrangements, substitutions, changes, modifications, etc., may be made without departing from the scope of claimed subject matter.

Additionally, FIG. 3 is described with reference to elements of the predictive intelligence training module 200 depicted in FIG. 2. However, the described embodiments are not limited to this depiction. More specifically, some elements depicted in FIG. 2 may be omitted from example implementations of the methods detailed herein. Additionally, other elements not depicted in FIG. 2 may be used to implement example methods.

Turning now to the method 300 and FIG. 3, beginning at block 302, "Receive an Electronic Information Index", an electronic information index may be received from the corpus 210 to train the predictive intelligence.

From block 302 to block 304, "Receive Criteria to Train the Predictive Intelligence", criteria may be received from the user 208 and stored in the database 206. Alternatively, the criteria may be received from the database 206, the criteria being previously stored in the database 206. At block 306, "Searching a Portion of the Received Electronic Information Index Applicable to the Trained Predictive Intelligence", the portion 114 may be searched by the trained predictive intelligence training module 204. Moving on to block 308, "Verifying the Trained Predictive Intelligence using the Searched Portion", the predictive intelligence training module 204 may verify the trained predictive intelligence using the searched portion 114.

From block 308 to block 310, "Determining if the Verification of the Trained Predictive Intelligence Meets a Particular Accuracy Threshold", the predictive intelligence training module 204 may determine if the verification of the trained predictive intelligence meets a particular accuracy threshold. As previously described, the particular accuracy threshold may be via the user 208, another predictive intelligence training module, a computing device, or any combination thereof.

At block 312, "Applying the Trained Predictive Intelligence to the Received Electronic Information Index upon Determining that the Verification Meets the Particular Accuracy Threshold", the predictive intelligence training module 204 may apply the trained predictive intelligence to the corpus 210.

In some embodiments, the method described with respect to FIG. 3 and elsewhere herein may be implemented as a computer program product, executable on any suitable computing system, or the like. For example, a computer program product for facilitating training of a knowledge base for e-discovery may be provided. Example computer program products are described with respect to FIG. 4 and elsewhere herein.

Figure 4:
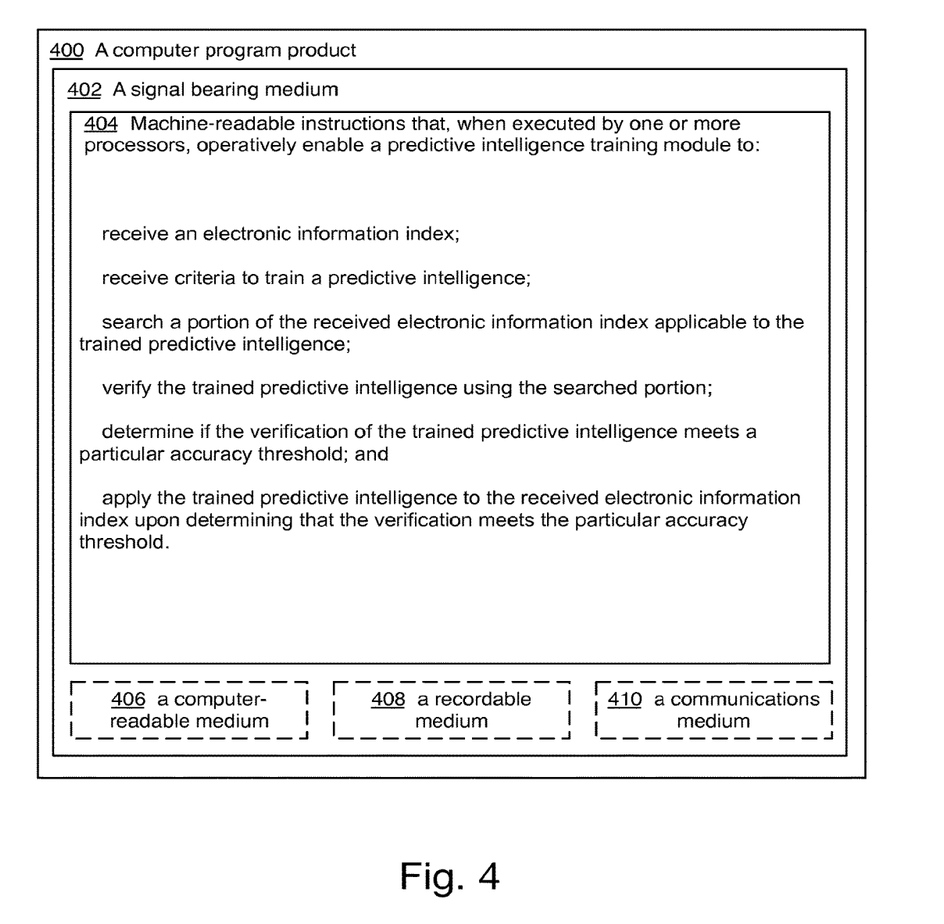
FIG. 4 illustrates an example computer program product.

FIG. 4 illustrates an example computer program product 400, arranged in accordance with at least some embodiments of the present disclosure. The computer program product 400 may include a machine-readable non-transitory medium having stored therein a plurality of instructions that, when executed (such as by one or more processors), operatively enable a knowledge base training module to train a knowledge base associated with e-discovery according to the embodiments of the processes and methods discussed herein. The computer program product 400 of one embodiment may include a signal bearing medium 402. The signal bearing medium 402 may include one or more machine-readable instructions 404, which, when executed by one or more processors, may operatively enable a computing device to provide the functionality described herein. In various examples, the devices discussed herein may use some or all of the machine-readable instructions.

In some examples, the machine-readable instructions 404 may include instructions that, when executed by one or more processors, may operatively enable a predictive intelligence training module to receive an electronic information index, receive criteria to train a predictive intelligence, search a portion of the received electronic information index applicable to the trained predictive intelligence, verify the trained predictive intelligence using the searched portion, determine if the verification of the trained predictive intelligence meets a particular accuracy threshold, and apply the trained predictive intelligence to the received electronic information index upon determining that the verification meets the particular accuracy threshold.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, the signal bearing medium 402 may encompass a recordable medium 408, such as, but not limited to, memory, read/write (R/W) CDs, R/W DVDs, etc.

In some implementations, the signal bearing medium 402 may encompass a communications medium 410, such as, but not limited to, a digital and/or an analog communication medium (e.g., a fiber optic cable, a waveguide, a wired communication link, a wireless communication link, etc.). In some examples, the signal bearing medium 402 may encompass a machine readable non-transitory medium.

In general, at least some embodiments of the method described with respect to FIG. 3 and elsewhere herein may be implemented in any suitable server and/or computing system. Example systems may be described with respect to FIG. 5 and elsewhere herein. In general, the computer system may be configured to train a knowledge base associated with e-discovery as described herein.

FIG. 5 is a block diagram illustrating an example computing device 500, arranged in accordance with at least some embodiments of the present disclosure. In various examples, the computing device 500 may be configured to train a knowledge base associated with e-discovery as discussed herein. In one example of a configuration 501, the computing device 500 may include one or more processors 510 and a system memory 520. A memory bus 530 can be used for communicating between the one or more processors 510 and the system memory 520.

Depending on the particular configuration, the one or more processors 510 may be of any type including but not limited to a microprocessor (µP), a microcontroller (µC), a digital signal processor (DSP), or any combination thereof. The one or more processors 510 may include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the one or more processors 510, or in some implementations the memory controller 515 can be an internal part of the processor 510.

Depending on the particular configuration, the system memory 520 may be of any type including but not limited to volatile memory (such as RAM), non-volatile memory (such as ROM, flash memory, etc.) or any combination thereof. The system memory 520 may include an operating system 521, one or more applications 522, and program data 524. The one or more applications 522 may include a predictive intelligence training application 523 that can be arranged to perform the functions, actions, and/or operations as described herein including the functional blocks, actions, and/or operations described herein. The program data 524 may include criteria data 525 for use with the predictive intelligence training application 523. In some example embodiments, the one or more applications 522 may be arranged to operate with the program data 524 on the operating system 521. This described configuration 501 is illustrated in FIG. 5 by those components within dashed line.

The computing device 500 may have additional features or functionality, and additional interfaces to facilitate communications between the configuration 501 and any other devices and interfaces. For example, a bus/interface controller 540 may be used to facilitate communications between the configuration 501 and one or more data storage devices 550 via a storage interface bus 541. The one or more data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 520, the removable storage 551 and the non-removable storage 552 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by the computing device 500. Any such computer storage media may be part of the computing device 500.

The computing device 500 may also include an interface bus 542 for facilitating communication from various interface devices (e.g., output interfaces, peripheral interfaces, and communication interfaces) to the configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 500 may also be implemented as a personal computer including both laptop computer and non-laptop computer configurations. In addition, the computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. An algorithm is here, and generally, considered to be a self-consistent sequence of operations or similar processing leading to a particular result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. However, all of these and similar terms are to be associated with appropriate physical quantities and are merely convenient labels. Unless specifically stated otherwise, discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the particular vehicle for implementation will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware is possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

The devices and/or processes are described in the manner set forth herein, and thereafter engineering practices may be used to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The subject matter described herein sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the particular functionality is achieved. Hence, any two components herein combined to achieve a particular functionality can be seen as "associated with" each other such that the particular functionality is achieved, irrespective of architectures or intermedial components. Likewise, any two components so associated can also be viewed as being "operably connected", or "operably coupled", to each other to achieve the particular functionality, and any two components capable of being so associated can also be viewed as being "operably couplable", to each other to achieve the particular functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, the terms may be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense generally understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense generally understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Additionally, all of the above also applies with respect to the various usages of the terms "embodiment" or "embodiments."

While certain exemplary techniques have been described and shown herein using various methods and systems, various other modifications may be made, and equivalents may be substituted. Additionally, many modifications may be made to adapt a particular situation to the teachings of claimed subject matter without departing from the concept (s) described herein. Therefore, it is intended that claimed subject matter not be limited to the particular examples disclosed, but that such claimed subject matter also may include all implementations falling within the scope of the appended claims, and equivalents thereof.

What is claimed is/are:

1. A method for training a predictive intelligence associated with electronic discovery (e-discovery) operating in a machine environment, the method comprising:
   receiving, at a computing device, an electronic information index;
   receiving, at the computing device, criteria to train the predictive intelligence associated with the e-discovery operating in the machine environment;
   searching, by the computing device, a portion of the received electronic information index applicable to the trained predictive intelligence associated with the e-discovery operating in the machine environment;
   verifying, by the computing device, the trained predictive intelligence associated with the e-discovery operating in the machine environment using the searched portion;
   determining, by the computing device, if the verification of the trained predictive intelligence associated with the e-discovery operating in the machine environment meets a particular accuracy threshold; and
   applying, by the computing device, the trained predictive intelligence associated with the e-discovery operating in the machine environment to the received electronic information index upon determining that the verification meets the particular accuracy threshold.

2. The method of claim 1 further comprising:
   identifying relevant documents; and
   locking the relevant documents.

3. The method of claim 1 further comprising:
   receiving further criteria to further train the trained predictive intelligence; and
   applying the further trained predictive intelligence to the received electronic information index.

4. The method of claim 1, wherein receiving the electronic information index comprises receiving an electronic information index of electronically stored information (ESI) included in an electronic information infrastructure of an organization in situ.

5. The method of claim 1, wherein receiving the electronic information index comprises receiving the indexed electronic information via a bot.

6. The method of claim 1, wherein receiving the criteria comprises receiving criteria related to information being responsive to an e-discovery process.

7. A machine readable non-transitory medium having stored therein instructions that, when executed by one or more processors, operatively enable a predictive intelligence training module associated with electronic discovery (e-discovery) operating in a machine environment to:
   receive, at a computing device, an electronic information index;
   receive, at the computing device, criteria to train a predictive intelligence associated with the e-discovery operating in the machine environment;
   search, by the computing device, a portion of the received electronic information index applicable to the trained predictive intelligence associated with the e-discovery operating in the machine environment;
   verify, by the computing device, the trained predictive intelligence associated with the e-discovery operating in the machine environment using the searched portion;
   determine, by the computing device, if the verification of the trained predictive intelligence associated with the e-discovery operating in the machine environment meets a particular accuracy threshold; and
   apply, by the computing device, the trained predictive intelligence associated with the e-discovery operating in the machine environment to the received electronic information index upon determining that the verification meets the particular accuracy threshold.

8. The machine readable non-transitory medium of claim 7, wherein the stored instructions that operatively enable the predictive intelligence training module further comprise instructions that, when executed by one or more processors, operatively enable the predictive intelligence training module to:
   identify relevant documents; and
   lock the relevant documents.

9. The machine readable non-transitory medium of claim 7, wherein the stored instructions that operatively enable the predictive intelligence training module further comprise instructions that, when executed by one or more processors, operatively enable the predictive intelligence training module to:
   receive further criteria to further train the trained predictive intelligence; and
   apply the further trained predictive intelligence to the received electronic information index.

10. The machine readable non-transitory medium of claim 7, wherein the stored instructions that operatively enable the predictive intelligence training module to receive an electronic information index include instructions that, when executed by one or more processors, operatively enable the predictive intelligence training module to:
    receive an electronic information index of electronically stored information (ESI) included in an electronic information infrastructure of an organization in situ.

11. The machine readable non-transitory medium of claim 7, wherein receiving the electronic information index comprises receiving the electronic information index via a bot.

12. The machine readable non-transitory medium of claim 7, wherein receiving the criteria comprises receiving criteria related to information being responsive to an e-discovery process.

13. A system for training a predictive intelligence associated with electronic discovery (e-discovery) operating in a machine environment comprising:
    a processor; and
    a predictive intelligence training module communicatively coupled to the processor, the predictive intelligence training module including a machine readable non-transitory medium having stored therein instructions that, when executed by processor, operatively enable the predictive intelligence training module to:

receive, at a computing device, an electronic information index;
receive, at the computing device, criteria to train a predictive intelligence associated with the e-discovery operating in the machine environment;
search, by the computing device, a portion of the received electronic information index applicable to the trained predictive intelligence associated with the e-discovery operating in the machine environment;
verify, by the computing device, the trained predictive intelligence associated with the e-discovery operating in the machine environment using the searched portion;
determine, by the computing device, if the verification of the trained predictive intelligence associated with the e-discovery operating in the machine environment meets a particular accuracy threshold; and
apply, by the computing device, the trained predictive intelligence associated with the e-discovery operating in the machine environment to the received electronic information index upon determining that the verification meets the particular accuracy threshold.

14. The system of claim 13, wherein the stored instructions that operatively enable the predictive intelligence training module further comprise instructions that, when executed by the processor, operatively enable the predictive intelligence training module to:

identify relevant documents; and
lock the relevant documents.

15. The system of claim 13, wherein the stored instructions that operatively enable the predictive intelligence training module further comprise instructions that, when executed by the processor, operatively enable the predictive intelligence training module to:

receive further criteria to further train the trained predictive intelligence; and
apply the further trained predictive intelligence to the received electronic information index.

16. The system of claim 13, wherein the stored instructions that operatively enable the predictive intelligence training module to receive an electronic information index include instructions that, when executed by the processor, operatively enable the predictive intelligence training module to:

receive an electronic information index of electronically stored information (ESI) included in an electronic information infrastructure of an organization in situ.

17. The system of claim 13, wherein receiving the electronic information index comprises receiving the electronic information index via a bot.

18. The system of claim 13, wherein receiving the criteria comprises receiving criteria related to information being responsive to an e-discovery process.

\* \* \* \* \*